United States Patent [19]
Strawn

[11] 3,901,310
[45] Aug. 26, 1975

[54] MULTIZONE ENVIRONMENTAL CONTROL SYSTEM

[75] Inventor: Charles F. Strawn, Arlington, Tex.

[73] Assignee: Johnson Service Company, Milwaukee, Wis.

[22] Filed: Nov. 27, 1973

[21] Appl. No.: 419,414

[52] U.S. Cl................................ 165/22; 165/50
[51] Int. Cl................................ F24f 3/00
[58] Field of Search............... 165/2, 22, 27, 50, 30

[56] References Cited
UNITED STATES PATENTS

| | | | |
|---|---|---|---|
| 3,567,115 | 12/1970 | Nelson | 165/22 |
| 3,568,760 | 3/1971 | Hogel | 165/22 |
| 3,602,427 | 8/1971 | Joesting | 165/22 |
| 3,788,386 | 1/1974 | Demaray | 165/22 |

Primary Examiner—Charles Sukalo
Attorney, Agent, or Firm—Johnson, Dienner, Emrich & Wagner

[57] ABSTRACT

A multizone environmental control system including a multizone air conditioning unit for supplying warm and cool air to a plurality of zones and a master control circuit for the multizone unit including a heat controller circuit which is responsive to an input signal provided by a zone controller circuit in the coolest zone to effect energization of a heating section of the multizone unit to permit warm air to be supplied to zones requiring heat and a cooling controller which is responsive to an input signal provided by a zone controller circuit in the warmest zone to effect positioning of an outside air damper to permit the entry of outside air into the system in an attempt to meet the cooling demands of zones requiring cooling and to effect energization of a cooling section of the multizone unit to provide additional cooling of the outside air if necessary to satisfy the cooling demands of the zones requiring cooling. The cooling controller circuit includes a switching circuit operable to inhibit operation of the outside air damper whenever the temperature of the outside air exceeds a preselected maximum value and an inhibit circuit operable to inhibit energization of the cooling section of the multizone unit whenever the temperature of the outside air is less than a predetermined minimum value.

18 Claims, 4 Drawing Figures

MULTIZONE ENVIRONMENTAL CONTROL SYSTEM

BACKGROUND OF THE INVENTION

1. Field of the Invention

This invention relates to environmental control systems, and, more particularly, to a control circuit for use in controlling an air conditioning unit in a multizone environmental control system.

2. Description of the Prior Art

In heating and air conditioning systems for large buildings, it is generally necessary to regulate the temperature of a number of individual zones within the building. For instance, it may be desirable to individually control the temperature of several adjacent zones from a common heating and cooling source such as a single large roof-top air conditioning unit. If some zones require heating while others require cooling, then both the heating and cooling sources must be energized simultaneously. The hot and cold air must be properly directed and mixed for each zone to maintain the desired temperature in such zone. The heating source must remain energized until the coldest zone is satisfied. Likewise, the cooling source must remain energized until the warmest zone is satisfied. When conditions are such that no zone requires heating, it is desirable that the heating source be deactivated to save energy. Similarly, the cooling source is preferably deactivated when no zone requires cooling.

In addition, to obtain more efficient use of the heating and cooling sources, it is generally desirable to use outside air to provide free cooling whenever possible. Thus, in addition to controlling the flow of warm or cool air from the heating and cooling sources, respectfully, it is desirable to control the positioning of an outside air damper such that a quantity of outside air is normally introduced into the cooling system during maximum heating and cooling seasons. However, the entry of warm outside air into the air conditioning system must be prevented if the temperature of the outside air increases beyond a point where outside air can no longer provide cooling.

SUMMARY OF THE INVENTION

The present invention provides a master control ciruit for use in controlling an air conditioning unit in a multi-zone environmental control system. The multizone air conditioning unit includes heating and cooling sections which are individually energizable by the master control circuit to supply warm and cool air, respectively, to a plurality of zones of the system over separate air ducts.

Each of the zones includes individual zone mixing dampers located in the hot and cold air ducts, and an associated zone controller means which controls the zone mixing dampers to regulate the flow of warm and cool air between the multi-zone unit and a given zone to permit the temperature of such a zone to be maintained at the desired level. The zone controller means for each zone is responsive to an output of an associated condition sensing device, such as a thermostat, to provide a control signal which is used to effect proper positioning of the associated zone mixing dampers.

In addition, the heating and cooling sections of the multi-zone unit are energized to provide either warm or cool air only upon demand of one or more of the zone controller means. Each zone controller means supplies input signals to the master control circuit which vary as a function of heating or cooling requirements for a given zone. Such input signals effect energization of the heating or cooling sections of the multi-zone unit and maintain the multi-zone unit energized until the heating or cooling demands are met for all of the zones.

Thus, as the heating and cooling sections of the multi-zone unit are selectively energized in response to input signals, indicating a demand for heating or cooling, supplied to the master control circuit by the zone controller means, the warm or cool air provided is supplied to all of the zones over the warm and cool air ducts. The amount of warm or cool air supplied to a given zone is controlled by the corresponding zone controller means associated with such zone.

The master controller circuit also includes means for enabling outside air to be introduced into the system whenever the temperature of the outside air is below a prescribed maximum temperature such that outside air can be used prior to energization of the mechanical cooling unit in an attempt to provide the desired cooling. The master control circuit is also operable to preclude the entry of outside air into the system whenever the temperature of the mixture of outside air and recirculated air is below a predetermined minimum value.

In accordance with one embodiment of the invention, the master control circuit includes heat controller means which is responsive to an input signal provided by the zone controller of the zone controller means of the coolest zone to effect energization of one or more of the heating stages of the multi-zone air conditioning unit to provide the amount of warm air required to satisfy the demand for the coolest zone. The master control circuit further includes cooling controller means which is responsive to an input signal supplied by the zone controller means associated with the warmest zone to effect selective energization of the cooling stages of the multi-zone unit or the provision of outside air to satisfy the cooling requirements for the warmest zone.

The master control circuit includes input means which receives the input signals provided by the zone controller means associated with each of the zones and which extends the input signal provided by the coolest zone to the heat controller means and the input signal provided by the warmest zone to the cooling controller means. The input signal provided by each of the zone controller means vary in amplitude as a function of heating or cooling requirements for the corresponding zone.

The heat controller means comprises a first signal comparator means which compares the input signals supplied thereto with a reference signal and provides a heating signal whenever the input signal provided by one or more of the zone controller means decreases to a value at which the difference between the compared signals exceeds a predetermined amount indicating a demand for heat for such zone. The heating signal is extended to a plurality of heat controller actuator means, each of which controls the energization of a different stage of the heating section of the multi-zone unit. Accordingly, whenever the heating signal exceeds a predetermined amplitude, a first heating controller actuator means will be enabled to energize the first stage of the heating unit. Thereafter, if the heating signal continues to increase, as the result of a decrease in the input signal, additional heat controller actuator means will be enabled to effect energization of further stages of the heating section of the multi-zone unit until the multi-zone unit has provided an amount of warm air sufficient to satisfy the demands for the zones which require heat.

When the heating requirements for all of the zones has been met as indicated by an increase in the amplitude of the input signals supplied to the master control circuit from zone controller means associated with zones requiring heat, the heating signal provided by the first signal comparator means will decrease effecting deenergization of the heating section of the multi-zone unit.

The cooling controller means comprises a second signal comparator means which compares the input signals supplied thereto with a reference signal and provides a cooling signal whenever the input signal provided by one or more of the zone controller means increases to a value at which the difference between the compared signals exceeds a predetermined amount indicating a demand for cooling in one or more of the zones. The cooling signal thus provided is used to control the positioning of an outside air damper and the energization of the cooling section of the multi-zone unit as a function of the temperature of the outside air.

The cooling controller means includes an outside air temperature monitoring means having third and fourth signal comparator means and a temperature sensing bridge circuit means which provides control signals which vary as a function of the temperature of the outside air, at inputs of the third and fourth signal comparator means. The third signal comparator means is enabled whenever the temperature of the outside air is less than a predetermined maximum value to permit the cooling signal provided by the cooling controller means to be extended over a switching means to an outside air damper controller means. The cooling signal effects positioning of the outside air damper to permit the entry of an amount of outside air into the system to meet the cooling demands of the warmest zone. If outside air alone is insufficient to satisfy the cooling demands of the warmest zone, the cooling signal is extended over an inhibit circuit means to a plurality of cooling controller actuator means to effect energization of the cooling stages of the multi-zone unit.

In the event the outside air temperature exceeds the prescribed temperature, the third signal comparator means disables the switching means, and the control of the outside air damper by the cooling signal is inhibited such that only mechanical cooling is employed.

The outside air temperature monitoring means further includes fourth signal comparator means which is enabled whenever the temperature of the outside air exceeds a predetermined minimum value to enable the inhibit circuit means to extend the cooling signal to the cooling controller actuator means.

The inhibit circuit means is normally enabled whenever the temperature of the outside air exceeds the predetermined minimum value to permit the cooling signal to be passed to the cooling controller actuator means. Accordingly, whenever the amplitude of the cooling signal exceeds a predetermined amount, a first cooling controller actuator means will be enabled to effect energization of a first stage of the cooling section of the multi-zone unit. If the cooling signal continues to increase as the result of further increase in the input signals provided by zone controller means associated with zones requiring cooling, further cooling controller actuator means will be enabled to effect energization of further stages of the cooling section of the multi-zone unit until the amount of cool air required to satisfy the demands of the warmest zone has been provided by the multi-zone unit.

Whenever the temperature of the outside air is below the predetermined minimum value, the fourth signal comparator means will disable the inhibit circuit thereby preventing the energization of the mechanical cooling section of the multi-zone unit.

When the cooling requirements are met for all of the zones requiring cooling, the input signal supplied to the master control circuit by the zone controller means associated with such zones will decrease. Such decrease will be detected by the second signal comparator means of the cooling controller means, causing a decrease in the amplitude of the cooling signal when the cooling signal decreases below a predetermined threshold value, the deenergization of the mechanical cooling unit will be effected.

The heat controller means and the cooling controller means which comprise the master control circuit provided by the present invention may employ solid state devices to provide the signal comparing and control functions necessary for controlling the multizone air conditioning unit to supply heating and cooling requirements for a plurality of zones. The use of solid state circuits results in improved reliability of the control system as well as lower manufacturing and installation costs for the system.

DESCRIPTION OF A PREFERRED EMBODIMENT

General Description

Figure 1:
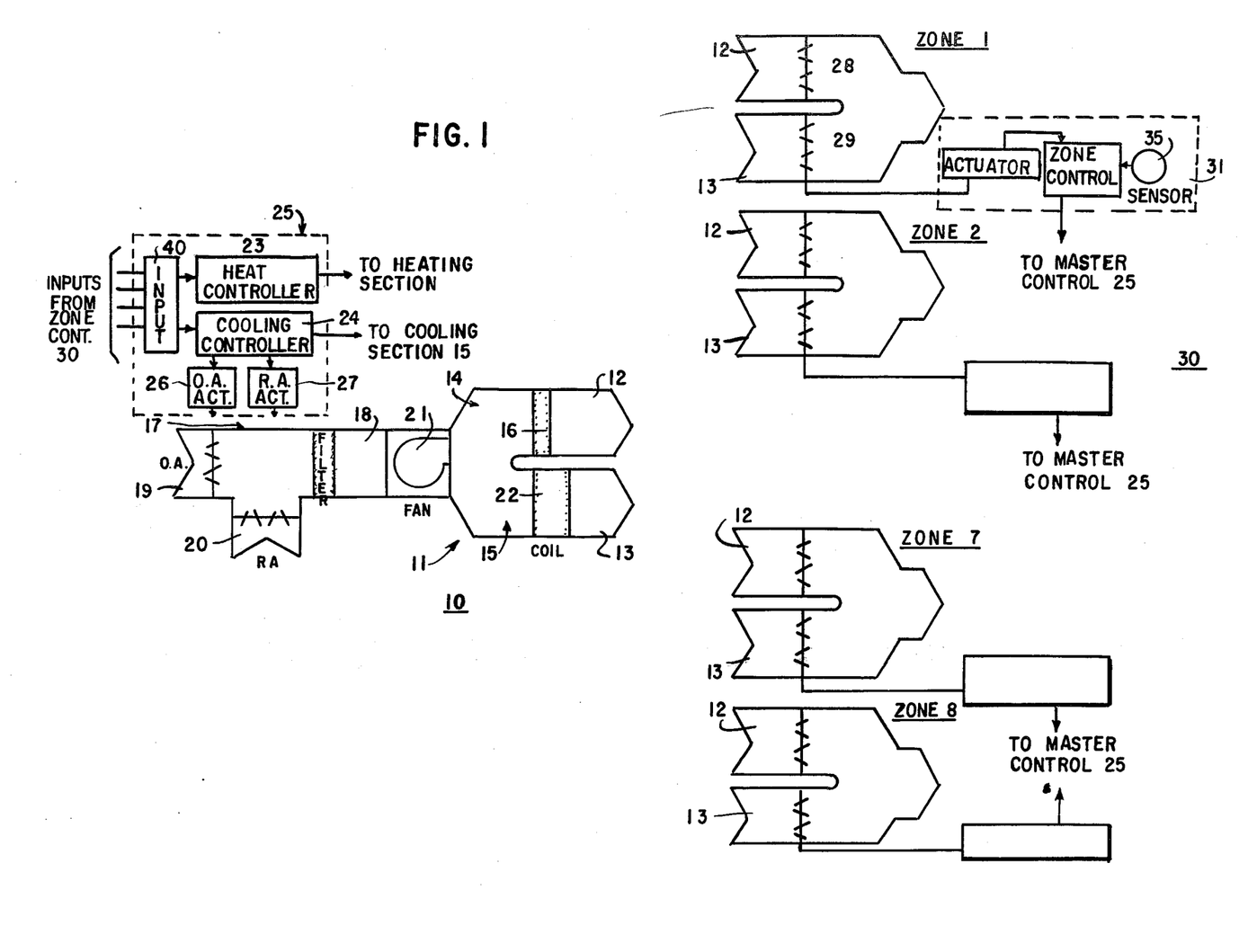
FIG. 1 is a schematic and partial block diagram of a typical dual duct multizone environmental control system.

A schematic block diagram of a typical dual duct multizone environmental control system 10 is shown in FIG. 1. The system 10 includes a multizone air conditioning unit 11 which supplies warm and cool air to a plurality of areas or zones within a building, for example. By way of illustration, it is assumed that the multizone unit 11 supplies the heating and cooling requirements for eight zones, four of which are shown in FIG. 1.

In dual duct systems, air is centrally conditioned by the multizone unit 11 which may, for example, be a rooftop unit, and distributed throughout the building in two parallel ducts 12 and 13. One of the ducts, such as duct 12, carries warm air, and the other duct 13 carries cool air.

The multizone unit 11 includes separate heating and cooling sections 14 and 15 which provide warm and cool air to the warm and cool air ducts, respectively. The heating section 14 includes a plurality of heating coils 16 which heat air supplied to the heating section 14 from an air intake section 17 which includes a duct 18, an outside air damper 19, a return air damper 20 and a fan 21. The air intake section 17 also supplies air to cooling coils 22 of the cooling section 15.

The heating coils 16 are selectively energizable by a heat controller 23 of a master control circuit 25, and the cooling coils 22 are selectively energizable by a cooling controller 24 of the master control circuit 25.

The master control circuit 25 also includes an outside air damper actuator 26 controlled by the cooling controller 24 to effect the positioning of the outside air damper 19, and a return air damper actuator 27 which controls the positioning of the return air damper 20.

The discharge of the multizone unit 11, via output ducts 12 and 13, is divided into eight zones in the present example, with each zone having an air supply from the heating section 14 and the cooling section 15.

Each of the zones, such as zone 1, includes a pair of zone mixing dampers, such as dampers 28 and 29 for zone 1, which are located in outlets of the warm air duct 12 and the cool air duct 13, respectively. The zone mixing dampers 28 and 29 permit selection of an air supply from the heating section 14, the cooling section 15 or from both sources. The zone mixing dampers 28 and 29 may be interconnected so that when the cooling damper 29 is closed, the heating damper 28 is open, and so that as the cooling damper 29 starts to open, for example, the heating damper 28 starts to close.

Each zone also includes a zone controller circuit 30, such as zone controller circuit 31 for zone 1, for controlling the positioning of the corresponding zone mixing dampers 28 and 29 for zone 1. A zone sensing device in each zone, such as sensing device 35 for zone 1, monitors a condition, such as temperature, in the corresponding zone and provides a sense signal for the associated zone controller to enable the zone controller to effect the desired positioning of the corresponding zone mixing damper.

For example, in response to a sense signal indicative of the temperature in zone 1 supplied to zone controller circuit 31 by zone sensing device 35, zone controller circuit 31 will control actuator 36 to effect positioning of the warm air damper 28 and the cool air damper 29 to obtain the amount of heating or cooling necessary to maintain the desired air temperature in zone 1.

The actuator 36 used to effect the positioning of the zone mixing dampers 28 and 29 may be a relay, a hydraulic actuator, or the like. One example of an actuator device suitable for this purpose is fully described in the copending U.S. application Ser. No. 326,855 of William F. Nolden which was filed Jan. 26, 1973 and which is assigned to the assignee of the present invention.

The actuator device of the referenced application has an actuator shaft which would be mechanically linked to the zone mixing dampers 28 and 29 such that driving the actuator shaft from its retracted position to an extended position would effect the desired positioning of the zone mixing dampers. For example, the control of the zone mixing dampers 28 and 29 may be such that the warm air damper 28 may be normally open and the cool air damper 29 may be normally closed when the actuator shaft is fully retracted, and the cool air damper 29 may be open and the warm air damper 28 may be closed when the actuator shaft is fully extended.

The actuator device of the referenced application may also be used to implement the actuators 26 and 27 which control the outside air damper 19 and the return air damper 20, respectively.

One example of an actuator control circuit which functions in the manner of the zone circuits 30 such as zone controller circuit 31, is disclosed in the copending U.S. application Ser. No. 326,854 of Charles F. Strawn which was filed on Jan. 26, 1973 and which is assigned to the same assignee as the present application. The details of the operation of the actuator control circuit are set forth in the referenced application. For the present application, it is sufficient to know that the actuator control circuit produces a feedback voltage ranging from 2–18 volts DC which corresponds to the distance that the actuator shaft is extended.

In the zone controller circuits, such as zone controller circuit 31, this feedback voltage which indicates the positioning of the zone mixing dampers 28 and 29, is compared with a sense signal indicative of the temperature in the corresponding zone, provided by the associated zone sensing device, such as device 35 for zone controller circuit 31, to provide a signal proportional to the difference between the two signals. The control signal is used to control the actuator device 36 to effect positioning of the zone mixing dampers 28 and 29 to provide the desired heating or cooling for the corresponding zone.

The DC feedback signals provided by all of the zone controller circuits 30 are also extended to the master control circuit 25 over an input circuit 40 thereof to enable the energization and the deenergization of the heating and cooling sections of the multizone unit 11 to be controlled by the zone controller circuits 30.

Figure 2:
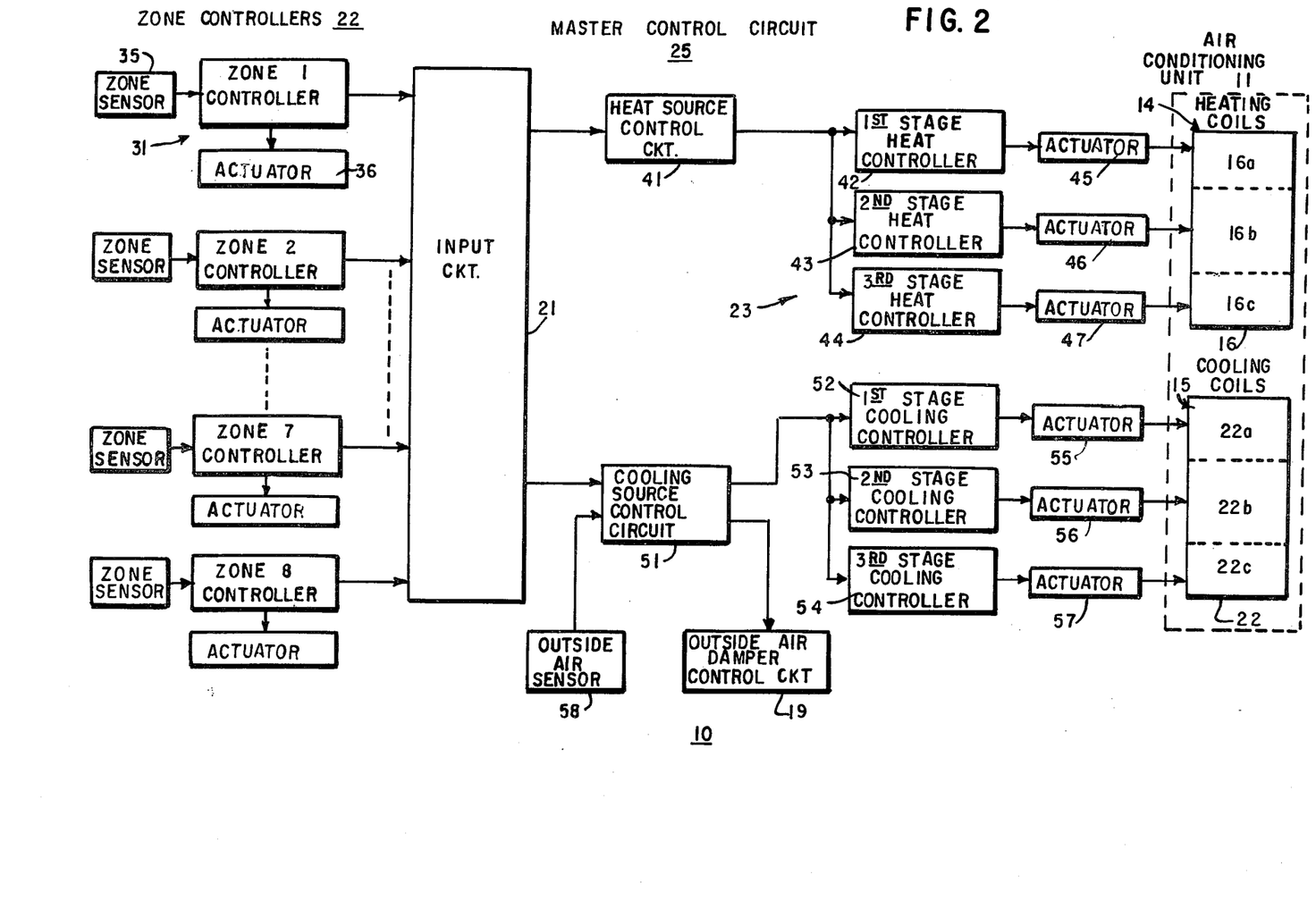
FIG. 2 is a block diagram of a master control circuit for use in the multizone environmental control system shown in FIG. 1.

Referring to FIG. 2, there is shown a block diagram of the master control circuit 25 which controls the operation of the multizone unit 11 in response to input signals supplied by the zone controller circuits 30. Whenever the conditions are such that none of the zones requires heating, the heating section 14 of the multizone unit 11 is deactivated to save energy. Likewise, the cooling section 15 of the multizone unit 11 is deactivated whenever no zone requires cooling.

Whenever the temperature in one or more of the zone decreases to a point where such zone or zones require heating to maintain a desired temperature in the zone, input signals in a first voltage range supplied to the input circuit 40 of the master control circuit 25 by the zone controller circuits of such zones will enable the heat controller 23 of the master control circuit 25 to selectively energize the heating coils 16 of the heating section 14 of the multizone unit 11.

The heating section 14 of the multizone unit 11 includes a plurality of separate heating coils 16, such as heating coils 16a–16c in the present example, each individually energizable by an associated actuator 45–47. The heat controller 23 includes a heat source control circuit 41 and a plurality of heating coil actuator controller stages 42–44, each individually associated with a different one of the heating coil actuators 45–47, to permit selective energization of the heating coils 16.

In addition, whenever the temperature in one or more of the zones increases to a point where such zone or zones require cooling to maintain a desired temperature in the zone, input signals in a second voltage range supplied to the input circuit 40 of the master control circuit 25 by the zone controller circuits of such zones will enable the cooling controller 24 of the master control circuit 25 to selectively energize the cooling coils 22 of the cooling section 15 of the multizone unit 11.

The cooling section 15 of the multizone unit 11 includes a plurality of cooling coils 22, such as cooling coils 22a–22c employed in the present example, each individually energizable by an associated actuator 55–57. The cooling controller 24 includes a cooling source control circuit 51 and a plurality of cooling coil actuator controller stages 52–54, each individually associated with a different one of the cooling coil actuators 55–57 to permit selective energization of the cooling coils 22.

The actuator devices 52–54 and 55–57 which control the energization of the heating coils 16a–16c and cooling coils 22a–22c, respectively may, for example, be a hydraulic actuator of the type disclosed in the copending U.S. application of William F. Nolden referenced above. The actuator device disclosed in the referenced application includes switch contacts operated when the actuator shaft is extended a predetermined distance from its retracted position. Such switch contacts when operated could complete an energizing path for the heating and cooling coils. Alternatively, any relay-type device of the proper size and electrical ratings could be used.

The cooling source control circuit 51 is also controlled by an outside air sensing device 58 to control the outside air damper 19 for introducing outside air into the system for cooling purposes whenever the temperature of the outside air is within prescribed limits.

Briefly, in operation, the master control circuit 25 is responsive to input signals representing a demand for heat or cooling, received over the input circuit 40 from one or more of the zone controller circuits 30 to provide signals to the heat controller 23, the cooling controller 24 or both, to effect the generation of the amount of heating or cooling necessary to supply the demands for each of the zones.

The heat source control circuit 41 is responsive to the input signal provided by the zone controller of the coolest zone to regulate the heating output of the heating section 14, and the cooling source control circuit 51 is responsive to the output signal provided by the zone controller of the warmest zone to regulate the output of the cooling section 15. The heating coil actuator controllers 42–44 will be sequentially enabled by the heat source control circuit 41 as required to provide the amount of heating required as indicated by the amplitude of the output signal received over the input circuit 40 from the zone controller of the coldest zone. Thus, for example, initially the first stage heating controller 42 will be energized to enable the first heating coil 16a to be energized via actuator 45. If such heating is insufficient to supply the demand indicated by the zone controller associated with the coolest zone, the second stage heating controller 43 will thereafter be energized to effect energization of the second heating coil 16b via actuator 46.

As the demand for heating decreases, the second stage heating controller 43 will be deenergized thereby deenergizing the second heating coil 16b. When the heating requirements have been met for all zones as indicated by the input signals supplied to the master control circuit 25 by the zone controllers 30, the first stage heating controller 42 will then be deenergized, thereby deactivating the heating source for the condition when no zone requires heating.

In a similar manner, the cooling source control circuit 51 is responsive to the input signal supplied over input circuit 40 by the warmest zone to control the cooling output of the multizone unit 11. However, prior to energizing the mechanical cooling section 15 of the multizone unit 11, the cooling source control circuit 51 will effect repositioning of the outside air damper to attempt to satisfy the cooling demand through the use of outside air, provided the temperature of the outside air is within prescribed limits as indicated by the outside air sensor 58.

If the cooling demands of the warmest zone are greater than that which can be satisfied by full use of outside air, or if the temperature of the outside air is not within the prescribed limits, the cooling source control circuit 51 will be enabled to effect selective energization of the cooling coils 22 over the associated cooling controller stages 52–54.

For example, when cooling by outside air is inadequate, the cooling source control circuit 51 will be responsive to the input signal provided by the warmest zone to enable the first stage cooling controller 52 to effect energization of the first cooling coil 22a via actuator 55. If such action is insufficient to provide the desired cooling, the second stage cooling controller 53 will then be enabled to energize the second stage cooling coil 22b over actuator 56.

The system will thus first attempt to satisfy cooling requirements with outside air before energizing the mechanical cooling unit 24. By modulating the outdoor air damper 19 and return air damper 20 to admit 100% outdoor air before energizing the mechanical cooling unit 24, the off-time of the compressor of the multizone unit 11 is as long as possible.

When the cooling demands of the zones have been met by either the use of outside air or through energization of the mechanical cooling source 24, the input signals supplied to master control circuit 25 from the zone controller in the warmest zone will be effective to disable the cooling source control circuit 51 thereby deactivating the mechanical cooling source 15 or minimizing the position of the outside air damper 19.

DETAILED DESCRIPTION

Figure 3:
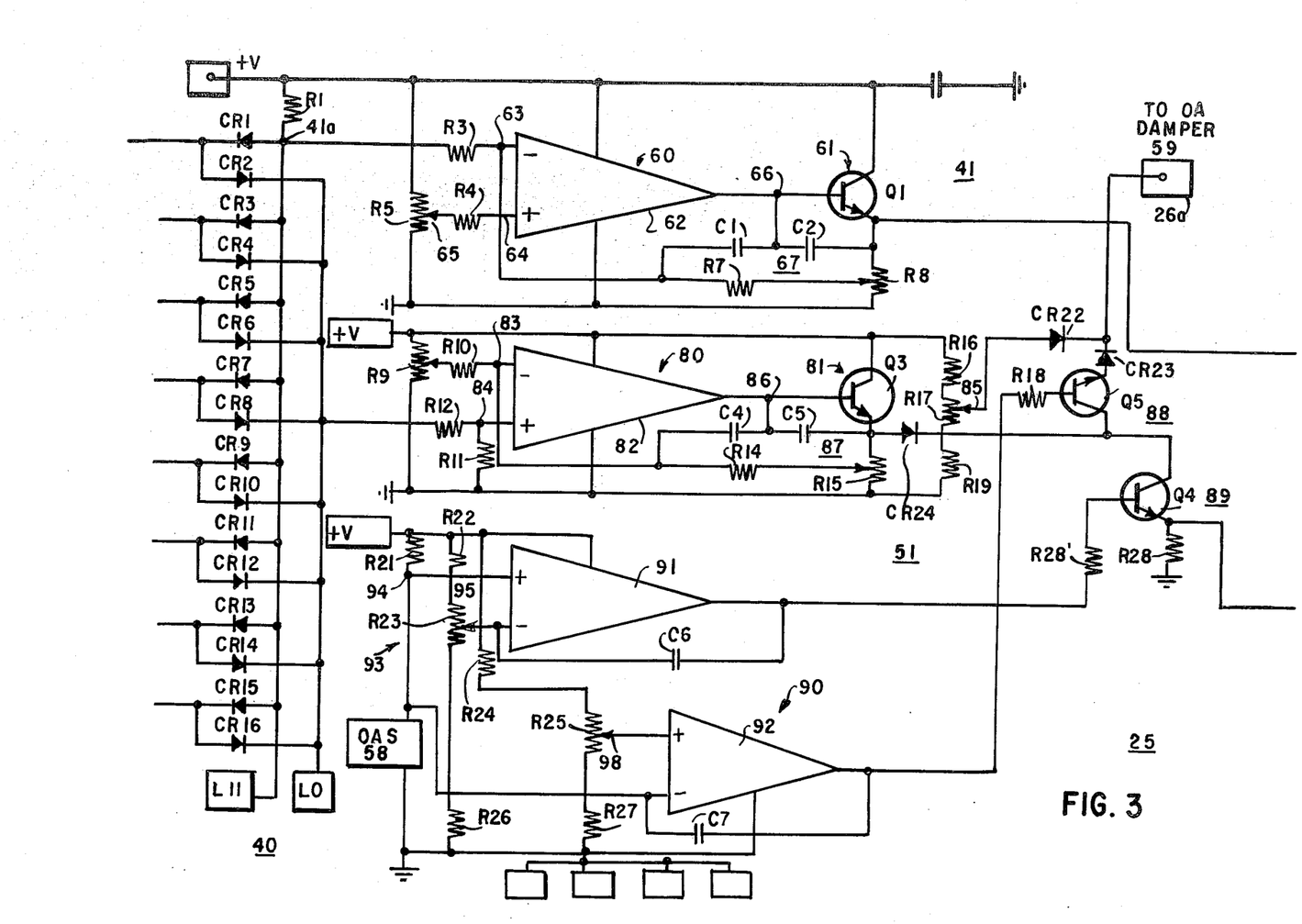
FIGS. 3 and 4 when arranged in a side-by-side relationship show a schematic circuit diagram for the master control circuit shown in FIG. 2.
Figure 4:
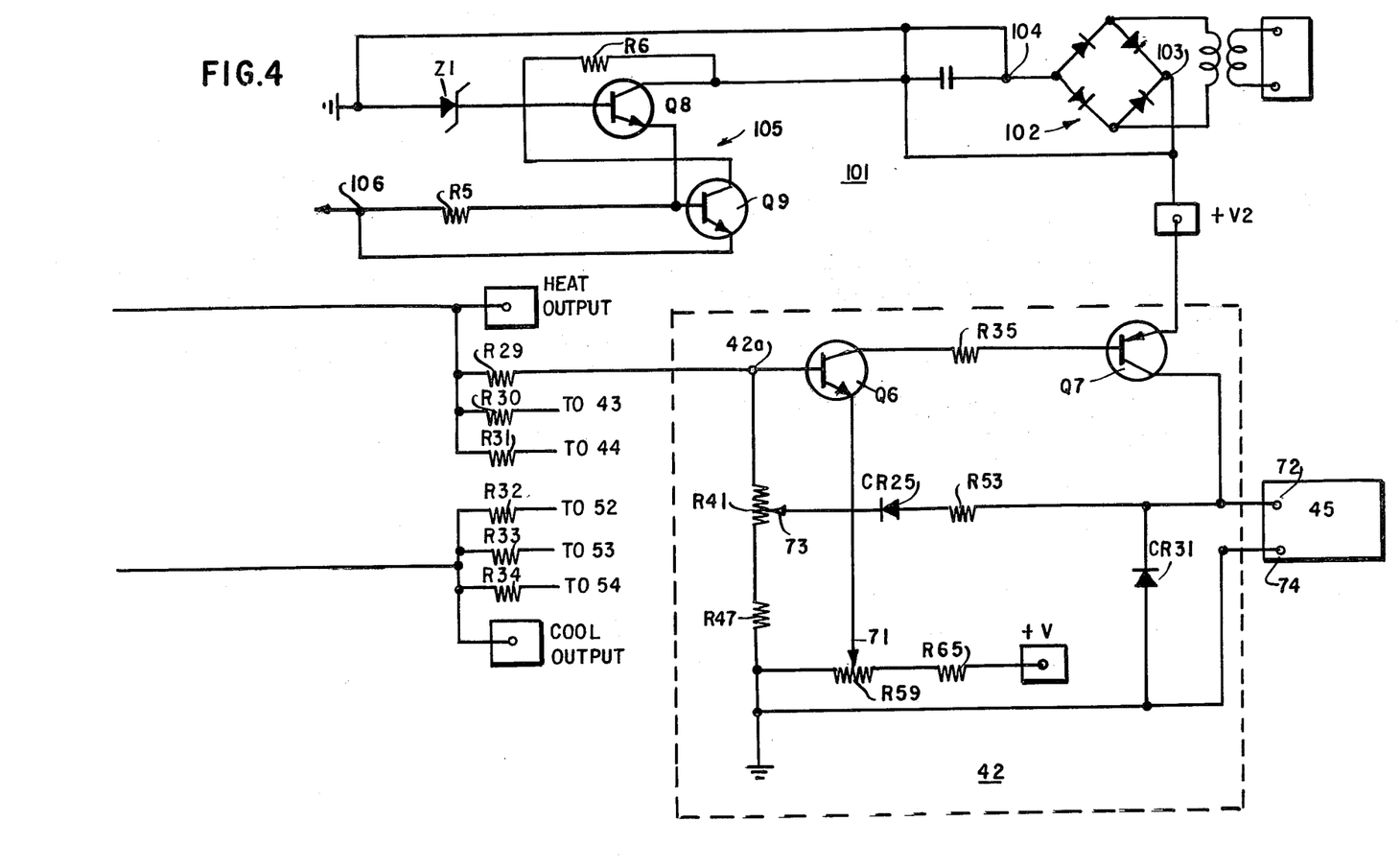

A schematic circuit diagram of the master control circuit 25 is shown in FIGS. 3 and 4 of the drawings when arranged in side-by-side relationship. Referring to FIG. 3, the input circuit 40 serves as an interface between the zone controller circuits 30 (FIG. 2) and the heat controller circuit 41 and the cooling controller circuit 51. The input circuit 40 is comprised of a plurality of diodes including diodes CR1–CR16 shown in FIG. 3.

The input circuit 40 includes a pair of input diodes for each zone controller circuit, such as input diodes CR1 and CR2 for zone controller circuit 31 in zone 1. One of the diodes, such as diode CR1, is connected in a reverse direction between an output of the zone controller circuit 31 and an input 41a of the heat source control circuit 41. A resistor R1 is connected between the input 41a of the heat source control circuit 41 and a voltage source +V.

The other diode CR2 is connected in a forward direction between the output of the zone controller circuit 31 and an input 51a of the cooling source control circuit 51.

Similarly, each of the remaining odd-numbered diodes, such as diodes CR3, CR5, - CR15, is individually connected in a reverse direction between the output of a different one of the zone controller circuits 30 and the input 41a of the heat source control circuit 41, and each of the even-numbered diodes, such as diodes CR2, CR4, - CR16, is individually connected in a forward direction between the output of a different one of the zone controller circuits 30 and the input 51a of the cooling source control circuit 51.

HEAT SOURCE CONTROL CIRCUIT

The heat source control circuit 41 is comprised of a differential amplifier stage 60 and an output driver or emitter-follower stage 61. The differential amplifier or signal comparator stage 60 includes a differential amplifier 62 having a negative input 63 connected over a resistor R3 to input 41a at the anodes of the odd-numbered diodes CR1, CR3, - CR15 of the input circuit 40 to receive input signals provided by the zone controller circuits 30. Diodes CR1, CR3, - CR15 serve as a low signal discriminating circuit to pass only signals below a certain amplitude to the amplifier 62.

Amplifier 62 also has a positive input 64 connected over a resistor R4 to a wiper 65 of a potentiometer R5. Potentiometer R5 is connected between a voltage source +V and ground to establish a reference potential at the positive input 64 of the amplifier 62. Potentiometer R5 serves as a heating range control and is adjustable to preselect the amplitude of the input signal supplied by the zone controller circuits 30 and correspondingly the low temperature of the zones at which the heating unit 14 will be energized.

Amplifier 62 is operable in an inverting mode to compare signals extended over resistor R3 to the negative input 63 of the amplifier 62 from the input circuit 40 with the reference potential provided at the positive terminal 64 by potentiometer R5 and resistor R4, to provide a heating control signal which represents the difference between the compared signals.

The differential amplifier stage 60 further includes a feedback network 67, including resistor R7, potentiometer R8 and a pair of capacitors C1 and C2 which are connected between the output of amplifier 62 and the negative input 63 of the amplifier 62. The output network 67 provides for adjustment of the gain of the differential amplifier 62 to permit selection of the heat bandwidth, or the amount of change in the amplitude of the input signals supplied to amplifier 62 by zone controllers 30 which is necessary to provide a heating control signal of sufficient amplitude to effect energization of the heating section 14 of the multi-zone unit 11.

The output of the amplifier 62 at terminal 66 is connected to the base of a normally non-conducting transistor Q1 of the emitter-follower driving stage 61. The collector of transistor Q1 is connected to the voltage source +V and the emitter of transistor Q1 is connected over a potentiometer R8 to ground.

The output of the heat source control circuit 41 at the emitter of transistor Q1 is extended over a resistor R29 (FIG. 4) to an input 42a of the heating coil actuator controller circuit 42, and also over resistors R30 and R31 to inputs of the heat actuator controller circuits 43 and 44 (not shown). Heat actuator controller circuits 43 and 44 are identical to heat actuator controller circuit 42.

Each heat actuator controller circuit, such as heat actuator controller circuit 42, may comprise a conventional Schmitt trigger circuit including a pair of transistors Q6 and Q7 and associated bias elements. Transistor Q6 and transistor Q7 are normally non-conducting. Transistor Q6, which serves as the input stage of the Schmitt trigger circuit, has a base electrode connected over terminal 42a and resistor R29 to the output of the heat control circuit 41 at the emitter of transistor Q1. The base of transistor Q6 is also connected over a potentiometer R41 and resistor R47 to ground. The emitter of transistor Q6 is connected to a wiper 71 of a potentiometer R59 which in turn is connected in series with a resistor R65 between the voltage source +V and ground. The collector of transistor Q6 is connected over a resistor R35 to the base of the output stage transistor Q7. Potentiometer R59 is adjustable to establish the turn on threshold for the Schmitt trigger circuit, and potentiometer R41 is adjustable to establish the deadband or turnoff threshold for the Schmitt trigger circuit.

The emitter of transistor Q7 is connected to a source of unregulated DC voltage +V2. The collector of transistor Q7 is connected to an output terminal 72 of the heat controller circuit 42 and over a resistor R53 and a diode CR25 to a wiper 73 of potentiometer R41. A diode CR31 is connected between output terminal 72 and an output terminal 74 of the heat controller circuit 42. Terminals 72 and 74 are connectable to the actuator device 45 (FIG. 2) which controls the first stage heating coil 16a as shown in FIG. 2.

As indicated above, the master control circuit 25 includes heat controller circuits 43 and 44, shown in block form in FIG. 2, which have inputs connected over resistors R30 and R31 to the output of the heat source control circuit 41 at the emitter of transistor Q1. However, the heat controller circuits 43 and 44, which control the energization of heating coils 16b and 16c, respectively, have higher turn on and turn off thresholds than the heat controller circuit 42.

Accordingly, heat controller circuit 41 will be turned on by a lower amplitude heating control signal than that required to turn on heat controller circuits 42 and 43. Likewise heat controller circuit 43 will turn on in response to a lower heat control signal than that required to turn on heat controller 44.

In a similar manner when the amplitude of the heating control signal decreases, heat controller 44 will turn off before heat controller circuits 43 and 42 turn off. Moreover, heat controller circuit 42 will remain energized when the heating control signal decreases to a value sufficient to effect turnoff of heat controller circuit 43.

Thus, in response to an increasing heat control signal, heat actuator circuits 42, 43 and 44 will be energized in succession to effect sequential energization of heating coils 16a, 16b and 16c, respectively. Likewise, heat actuator circuits 44, 43 and 42 will be deenergized in sequence as the heat control signal decreases, effecting sequential deenergization of the heating coils 16c, 16b and 16a.

COOLING SOURCE CONTROL CIRCUIT

Referring again to FIG. 3, the cooling source control circuit 51 includes a cooling source control amplifier stage 80, as associated output driver stage 81, and an outside air temperature monitoring circuit 90, including differential amplifiers 91 and 92 and a temperature sensing bridge 93 which is connected to inputs of the amplifiers 91 and 92.

Cooling source control amplifier 80 includes a differential amplifier 82 having a positive input 84 connected over a resistor R12 to the input 51a of the cooling source control circuit 51 and to the cathodes of the even-numbered diodes CR2, CR4, - CR16 of the input circuit 40, which serve as a high signal discriminator circuit. The positive input 84 of amplifier 82 is also connected over a resistor R11 to ground.

A negative input 83 of the amplifier 82 is connected over a resistor R10 to a wiper 84 of a potentiometer R9. Potentiometer R9 is connected between the voltage source +V and ground to establish a reference potential at the negative input 83 of the amplifier 82. Potentiometer R9 is adjustable to set the cooling range for the master control circuit 25, to thereby preselect the amplitude of the input signal supplied by the zone controller circuits 30, and correspondingly, the high temperature of the zones, at which the cooling unit 15 will be energized.

Amplifier 82 is operable in a non-inverting mode to compare the signal extended over resistor R12 to the positive input 84 from the input circuit 40 with the reference potential provided at the negative input terminal 83 over potentiometer R9 and resistor R10 and to provide a cooling control signal which represents the difference between the compared signals.

The differential amplifier 82 has an associated output network 87 which includes a potentiometer R15, a resistor R14 and capacitors C4 and C5. Potentiometer R15 serves to permit adjustment of the gain of the differential amplifier circuit 82 to establish a cooling bandwith for the master control circuit 25, or the amount of change in the amplitude of the input signals supplied to the amplifier 82 by the zone controllers 30 that is necessary to provide a cooling control signal of sufficient amplitude to effect energization of the cooling section 15 of the multi-zone unit 11 or repositioning of the outside air damper 19.

The output of differential amplifier 82 at terminal 86 is connected to the base of a normally non-conducting transistor Q3 of the emitter-follower output driving stage 81 of the cooling source control circuit 51. Transistor Q3 has a collector connected to the voltage source +V and an emitter connected over potentiometer R15 to ground.

A voltage divider circuit, including resistor R16, potentiometer R17 and resistor R19 is connected between the collector and the emitter of transistor Q3 to establish a reference potential over wiper 85 of potentiometer R17 and diode CR22 to terminal 26a at the input of the outside air damper actuator control circuit 26. The reference potential extended to the outside air damper actuator control circuit 26 establishes a minimum position setting for the outside air damper 19 and is adjustable via potentiometer R17.

The output of the cooling source control circuit 51 is extended from the emitter of transistor Q3 over a diode CR24 and an inhibit circuit 89 to resistors R32-R34 (FIG. 4) which in turn are individually connectable to inputs of the cooling stage actuator controllers 52-54 (shown in block form in FIG. 2). Cooling controller actuator circuits 52-54 are identical to the heat controller actuator circuit 42 shown in FIG. 4. The cooling controller circuits 52, 53 and 54, which control the energization of cooling coils 22a, 22b and 22c, respectively, also have successively higher turn-on and turn-off thresholds such that in response to an increasing cooling control signal, cooling coil 22a will be energized first, then cooling coil 22b and finally cooling coil 22c. In addition, in response to a decreasing cooling control signal, cooling coil 22c will be deenergized first. Thereafter cooling coil 22b will be deenergized and cooling coil 22a will be deenergized last.

The inhibit circuit 89 includes a normally non-conducting transistor Q4 having its collector connected to the cathode of diode CR24 and its emitter connected to ground over resistor R28. The base of transistor Q4 is connected over a resistor R28' to the output of differential amplifier 91 of the outside air temperature monitoring circuit 90 which effects the enabling of the inhibit circuit 89 whenever the temperature of the outside air exceeds a preselected minimum value to permit the cooling signal provided by amplifier 80 to be extended to the cooling stage controllers 52-54 to effect activation of the mechanical cooling stage 15.

The cooling signal provided by the cooling source control amplifier 80 is also extended over a switching circuit 88, when enabled, to a terminal 26a which is connected to the outside air damper actuator control circuit 26 (FIG. 1). The switching circuit 88 includes a normally non-conducting transistor Q5 having a collector connected to the output of the cooling source control amplifier 80 at the cathode of diode CR24. The emitter of transistor Q5 is connected over a diode CR23 to terminal 26a at the input of the outside air damper actuator circuit 26. The base of transistor Q5 is connected over resistor R18 to an output of amplifier 92 of the outside air temperature monitoring circuit 90 which effects the enabling of the switching circuit 88 whenever the temperature of the outside air is less than a preselected maximum value to permit the cooling signal to be extended to the outside damper actuator 26.

The differential amplifier circuits 90 and 91 of the outside air temperature monitoring circuit 90 are in turn controlled by signals provided by the outside air temperature monitoring bridge circuit 93.

The bridge circuit 93 has a first leg including a resistor R21 connected in series with the outside air sensor 58 between the voltage source +V and ground. A second leg of the bridge circuit 93 includes a resistor R22, a potentiometer R23 and a resistor R26, which are connected in series between the voltage source +V and ground. A third leg of the bridge includes resistor R24, potentiometer R25, and resistor R27 which are connected between the voltage source +V and ground.

The differential amplifier 91 has a positive input connected to the junction of resistor R21 and the outside air sensor 58 in the first leg of the bridge circuit 93. Amplifier 91 also has a negative input connected to a wiper 95 of potentiometer R23 in the second leg of the bridge circuit 93. Accordingly, signals supplied to the differential inputs of amplifier 91 will be the difference between a signal level at junction point 94, as determined by the temperature measured by the outside air sensor, and a preselected voltage established at the wiper 95 of potentiometer R23. A capacitor C6 is connected in a feedback path between the output of the amplifier 91 and the negative input of the amplifier 91.

Amplifier 91 is operable as a lower null circuit to provide a signal for enabling transistor Q4 of the inhibit circuit 89 whenever the temperature of the outside air is above a predetermined value, such as 55°F, for example, to permit the mechanical cooling source 15 to be controlled by the cooling signal provided by the cooling source amplifier 80. The lower null temperature, 55°F in the present example, is determined by the setting of potentiometer R23.

The lower null circuit 91 provides an output which enables transistor Q4 whenever the temperature of the outside air exceeds 55°F, for example, to permit the cooling signal to be passed to the cooling controller circuits 52–54. When the outside air temperature drops below 55°F, the output of the lower null circuit 91 will be insufficient to maintain transistor Q4 on and thus the cooling signal will be prevented from reaching the cooling controller circuits 52–54, thereby inhibiting the energization of the mechanical cooling source 15 when outdoor air is too cold.

The second differential amplifier 92 of the outside air temperature monitoring circuit 90 has a positive input connected to a wiper 98 of potentiometer R25 in the third leg of the bridge circuit 91. Amplifier 92 further has a negative input connected to the junction point 94 of the outside air sensor 58 and resistor R21 in the first leg of the bridge circuit 90. Accordingly, the input signal supplied to the differential inputs of amplifier 92 will be the difference between the potential provided at junction point 94 by the outside air sensor 58 and the reference potential provided at the wiper 98 of potentiometer R25. A capacitor C7 is connected in a feedback path between the output of the amplifier 92 and the negative input of the amplifier 92.

Differential amplifier circuit 92 is operable as an upper null circuit which provides a signal for enabling transistor Q5 whenever the outside air temperature is below a predetermined value such as 75°F, for example. The upper null temperature, 75°F in the present example, is determined by the setting of potentiometer R25.

The potential established at junction point 94 by the outside air sensor 58 is proportional to the temperature of the outside air. Thus, when the temperature is below 75°F, for example, the output signal provided by amplifier 92 will be sufficient to bias transistor Q5 conductive to permit the cooling signal provided by the cooling amplifier 80 to be passed over the collector-emitter circuit of transistor Q5 to the outside air damper actuator 26. The outside air damper actuator 26 is responsive to the cooling signal to position the outside air damper 59 to allow entry of outside air into the system to provide cooling.

When the temperature increases above 75°F. the output signal provided by amplifier 92 will cause transistor Q5 to be cut off to prevent the cooling control signal from being passed to the outside air damper controller 26 such that the outside air damper 59 will be maintained closed.

POWER SUPPLY CIRCUIT

The master control circuit 25 also includes a power supply circuit 101, shown in FIG. 4, having a full-wave rectification bridge circuit 102 which provides an unregulated DC voltage, derived from a 120 VAC line voltage, at an output terminal 103 of the bridge circuit 102. The unregulated voltage is used to energize the actuator coils of the heating controller actuators 45–47 and the cooling controller actuators 55–57, such as actuator coil 72 for actuator 45.

The power supply circuit 101 also includes a regulator circuit 105 including transistors Q8 and Q9 and Zener diode Z1 which derives a regulated voltage +V at an output 106 from the unregulated DC voltage provided at output 103 of the bridge circuit 102. The regulated DC voltage, which is used to supply power to the operational amplifiers and transistors of the master control circuit 25 may, for example, be 20 volts DC.

OPERATION OF MASTER CONTROL CIRCUIT

To describe the operation of the master control circuit 25, shown in FIGS. 3 and 4, it is assumed initially that the heating and cooling conditions of all the zones are satisfied such that the heat source control circuit 41 and the cooling source control circuit 51 are disabled, and that the outside air damper 19 is at a minimum position to permit a minimum amount of outside air to be supplied to the system.

As was indicated above, each of the zone controller circuits 30 is operable to provide an input signal ranging from 2 to 18 volts DC. The amplitude of the input signal provided by a given zone controller will vary in accordance with heating or cooling demands for the corresponding zone. Thus, for example, it may be assumed that each zone controller circuit, such as zone controller circuit 31, provides an input signal of approximately 10 volts when the heating or cooling requirements of the corresponding zone, zone 1 for zone controller 31, are met.

Subsequently, when the air temperature in zone 1 decreases to a point where heating is required, the input signal provided by the zone controller circuit 31 for zone 1 will decrease to a value less than 10 volts with the amount of such decrease being indicative of the amount of heating required. Similarly, if the air temperature in zone 1 increases to a point where cooling is required, the input signal provided by the zone controller circuit 31 for zone 1 will increase to a value greater than 10 volts with the amount of such increase being indicative of the amount of cooling required.

The master control circuit 25 responds to the input signals provided by the warmest and the coolest zones provided by the warmest and the coolest zones to effect energization of the heating and cooling sources 14 and 15, respectively.

In the exemplary system, the zone controller of the coolest zone produces the lowest input signal while the zone controller of the warmest zone produces the highest input signal. The signal discrimination functions are provided by the diodes CR1–CR16 of input circuit 40.

With reference to FIG. 1, when the temperature in zone 1, for example, decreases to a point where heating is required, the associated zone controller circuit, such as the zone controller circuit 31 will respond to an output of the associated zone sensing device 35 to effect repositioning of the associated zone mixing damper 28 to open the hot air damper 28 to the warm air duct 12 and to close the cold air damper 29 to the cold air duct 13.

As the zone controller circuit 31 effects positioning of the warm air damper 28 (FIG. 1) the amplitude of the input signals supplied to the input circuit 40 of the master control circuit 25 (FIG. 3) will decrease to less than 10 volts causing diode CR1 to become forward biased. Accordingly, the potential at the input 41a of the heat source controller circuit 41 will also decrease causing a corresponding decrease in the signal at the negative input 63 of the differential amplifier 62.

When the input signal supplied to the negative input 63 of the amplifier 62 decreases to a value below the heat range threshold established at the positive input 64 of amplifier 62 by potentiometer R5, the amplifier 62 will provide a heating control signal, representing the difference between the input signal and reference signal, at the output 66 of the amplifier 62. When the difference between the input signal and the reference signal, as amplified by amplifier 62, exceeds a value sufficient to effect turn-on of output driver transistor Q1, transistor Q1 will become forward biased permitting the heating control signal to be passed over the output stage 61 of the heat source control circuit 41 and be extended over resistor R29 to input 42a of heat actuator control circuit 41. The heating control signal is also extended over resistors R30 and R31 to heat actuator controller circuits 43 and 44.

When the amplitude of the heating control signal exceeds the switching threshold of the heat actuator controller circuit 42, the Schmitt trigger circuit will be enabled causing transistor Q6 to be turned off and transistor Q7 to be turned on. When transistor Q7 is turned on, an energizing path is provided from the unregulated voltage source at terminal 103 of the power supply circuit 101 over the emitter collector circuit of transistor Q7 and the coil (not shown) of the actuator 36 connected between the terminals 72 and 74 to ground. When actuator 36 is energized, associated contacts (not shown) will be closed to provide an energizing path for heating coil 16a of the first stage of the heating source 14.

Accordingly, as the fan 21 (FIG. 1) draws air through the return air damper 20 or the outside air damper 19 and into the heating section 14 of the multizone unit 11, such air will be heated as it is passed over heating coil 16a prior to being passed to the warm air duct 12. The heated air is extended to all of the zones over the warm air duct 12. Zones which are requiring heating, such as zone 1, have an associated zone mixing damper adjusted such that the warm air damper 28 is open to the warm air duct 12 to permit the warm air to flow into such zone.

If the heating provided in response to the energization of only the first stage coil 16a of the heating source 14 is insufficient to supply the demands of zone 1 or any other zones requiring heat, the input signal supplied over diode CR1 to the heat source control circuit 41 will continue to decrease as the shaft of the zone actuator 36 is driven by the zone controller circuit 31 to open the zone mixing damper in the hot air duct output for zone 1. Accordingly, the heating control signal provided at the output of the heat source control circuit 41 will reflect a corresponding increase, and when the amplitude of the heat control signal increases to a value which exceeds the threshold level of the heat actuator controller circuit 43, the Schmitt trigger circuit of such heat actuator controller circuit 43 will be enabled to effect energization of the associated actuating device 46 to effect energization of heating coil 16b of the second stage of the heating source 14.

If additional heating is required, as indicated by further decrease in the amplitude of the input signal supplied to the heat source control circuit 41, and further increase in the heating control signal, the heat actuator controller circuit 44 will be energized to effect energization of heating coil 16c of the heating source 14.

As the space temperature in zone 1 increases in response to the warm air supplied thereto, the amplitude of the input signal supplied to the heat source controller circuit 41 will begin to increase as the zone controller circuit 31 drives the shaft of the associated actuator device 36 to cause the warm air damper 28 to be moved towards its minimum open position. The increase in amplitude of the input signal will cause a corresponding decrease in the amplitude of the heating output signal provided by the heat source controller circuit 41. Accordingly, as the space temperature of zone 1 increases, the heat actuator controller circuits 42–44 will be successively disabled in reverse as the amplitude of the heating control signal decreases below the turn-off thresholds of the controller circuits 42–44. As the heat stage controller circuits 42–44 are successively disabled, the heating coils 16a–16c will be deenergized such that the heating source 14 will be deactivated when all the heating requirements for all of the zones have been met.

COOLING CONTROLLER

As the space temperature in any zone, such as in zone 1, increases, as indicated by the signal output of the associated temperature sensing device 35, the zone controller circuit 31 will be enabled to energize the corresponding actuator 36 to close the warm air damper 28 to the warm air duct 12 and to open the cool air damper 29 to the cool air duct 13.

As the actuator shaft of the actuator 36 associated with zone 1 is driven towards an extended position, for example, by the zone controller circuit 31, the amplitude of the input signal extended to the input circuit 40 of the master control circuit 25 by zone controller circuit 31 will increase. The increasing input signal will cause diode CR2 to become forward biased such that the potential at the positive input 84 of differential amplifier 82 of the cooling source controller circuit 80 will increase.

When the amplitude of the input signal supplied to the positive input 84 of amplifier 82 exceeds the cooling range threshold established at the negative input 83 of the amplifier 82 via potentiometer R9, the amplifier 82 will provide a cooling control signal representing the difference between the input signal and the reference voltage at output 86 of the amplifier 82.

When the difference between the input signal and the reference signals as amplified by amplifier 82 is sufficient to forward bias transistor Q3 of the output driver stage 81, transistor Q3 will be turned on, permitting the cooling control signal to be passed over diode CR 24 and the collector emitter circuit of transistor Q5 of the switching circuit 88, and to the outside air damper actuator circuit 26 and also over the collector emitter circuit of transistor Q4 of the inhibit circuit 89 to the coding controller actuator circuits 52–55.

In the exemplary system, the cooling signal will be extended over the collector-emitter circuit of transistor Q5 of the switching circuit 88 to the outside air damper control actuator 26 only if the temperature of the outside air, as indicated by the outside air sensor 58, is less than 75°F.

Whenever the temperature of the outside air is less than 75°F., the potential at junction point 94 of the bridge circuit 93 will be less than the reference potential extended to the positive input of amplifier 92. Accordingly, differential amplifier 92 will provide a positive output signal of an amplitude sufficient to render transistor Q5 conductive to permit the cooling signal to be passed over the collector-emitter circuit of transistor Q5 and diode CR 23 and terminal 26a to the outside air damper actuator circuit 26.

Because of the bias level provided at terminal 26a by potentiometer R17, a cooling signal of an amplitude insufficient to enable the Schmitt trigger circuits of the cooling actuator controller circuits 52–54 will be effective to enable the outside air damper actuator controller 26. Thus, prior to energization of the mechanical cooling source 15, the amount of outside air introduced into the system through the outside air damper 19 will be increased in an attempt to satisfy the cooling demands through the use of outside air. The outside air is drawn through the cooling section 14 of the multizone unit 11 by the fan 21 and conducted over the cool air duct 13 to all of the zones.

If the temperature of the outside air is greater than 75°F., the potential at junction point 94, and thus at the negative input of amplifier 92, the signal provided by amplifier 92, representing the difference between the reference signal provided at the positive input of amplifier 92 and the input signal provided at the negative input of amplifier 92 will be insufficient to maintain transistor Q5 conductive. Accordingly, transistor Q5 will be cutoff and the cooling signal will be prevented from reaching the outside air damper actuator circuit 26.

If the cooling demand of the warmest zone is greater than that which can be satisfied by full use of outside air, the input signal supplied to the master control circuit 25 over the input circuit 40 by zone controller 31, for example, will cause the cooling source control circuit 51 to provide a cooling control signal of a value which exceeds the threshold setting of cooling actuator controller circuit 41 thereby effecting energization of the Schmitt trigger circuit of the cooling source actuator controller 52.

When the cooling control signal increases to a value sufficient to enable cooling controller actuator circuit 52, cooling coil 22a of the mechanical cooling unit 15 will be energized to permit mechanical cooling of air supplied to the cool air duct 13 over the cooling section 15 of the multizone unit 11.

As the space temperature of the warmest zone decreases in response to the cool air supplied by the cooling source 15, the input signal supplied to the master control circuit 25 will decrease causing a decrease in the amplitude of the cooling control signal. When the cooling control signal decreases to a point where the cooling control signal reaches an amplitude less than the turn-off threshold of the Schmitt trigger circuit of cooling actuator controller circuit 52, the cooling coil 22a will be deenergized. If two or three stages of cooling are used, the cooling coil of each succeeding stage will be energized only after the previously energized stages of cooling have proven insufficient for the requirements of the warmest zone. Moreover, as the cooling demands of the warmest zone decrease, the cooling coils 16a–16c of the cooling section 15 will be deenergized in the reverse sequence.

As the space temperature of the warmest zone decreases, the mechanical cooling source 15 will be deenergized first and than the outdoor and return air dampers will be modulated back toward minimum positions in response to the input signals supplied to the master control circuit 25 by the warmest zone. The system will then recycle, first attempting to cool with outside air before energizing the mechanical cooling source 15.

By modulating the outdoor and return air dampers to admit 100% outdoor air before energizing the mechanical cooling source 15, the off time of the compressor of the multi-zone unit 11 is as long as possible.

Whenever the temperature of the outside air decreases below 55°F, as indicated by the potential provided by the outside air sensor 58 at junction point 94 and at the positive input of amplifier 91 will be equal to or less than the amplitude of the reference signal provided by potentiometer R23 at the negative input of amplifier 91. Accordingly, the output signal provided by the amplifier 91, which is operable in the non-inverting mode, will cause transistor Q4 of the inhibit circuit 89 to be cut off to prevent the cooling control signal from reaching the mechanical cooling unit 15.

Thus, it is seen that the master control circuit 25 controls the outside air damper 19 in sequence with the cooling coil actuators 55–57 and inhibits the operation of the outside air damper 19 when the outside air temperature exceeds 75°F, in the illustrative example, and inhibits the energization of the cooling coils 22a–22c of the mechanical cooling source 15 when the temperature of the outside air is below 55°F.

I claim:

1. In a multi-zone environmental control system including an air conditioning unit for supplying warm and cool air to a plurality of zones of a building, and an outside air damper means controllable to permit outside air to be introduced into said system, a plurality of zone controller means including an individual zone controller means for each of said zones for regulating the flow of warm and cool air supplied by said air conditioning unit into the corresponding zone to permit the temperature of the zone to be maintained at a preselected level, a control circuit for effecting selective energization of heating apparatus and cooling apparatus of said air conditioning unit in accordance with command signals provided by said zone controller means which are indicative of the heating and cooling demands of said zones, said control circuit comprising heat controller means including heat source control means and heat actuator controller means, said heat source control means including first signal comparator means having a first input connected to receive command signals indicative of the heating demand for the coolest zone, and a second input connected to receive a first reference signal, said first signal comparator means being operable to provide a heat control signal for enabling said heat actuator controller means for energizing the heating apparatus whenever the amplitude of the command signal extended thereto differs with the reference signal by a predetermined amount, and cooling controller means including cooling source control means and cooling actuator controller means, said cooling source control means including second signal comparator means having a first input connected to receive a further command signal indicative of the cooling demand of the warmest zone and a second input connected to receive a second reference signal said second signal comparator means being operable to provide a cooling control signal for enabling said cooling actuator controller means for energizing said cooling apparatus whenever the amplitude of the command signal extended thereto differs with the second reference signal by a predetermined amount, outside air monitoring means for providing an output indicative of the temperature of the outside air, first control means enabled by said outside air monitoring means whenever the outside air temperature is less than a predetermined maximum value to enable outside said air damper means to be controlled by said cooling control signal prior to energization of said cooling apparatus and second control means including inhibit means enabled by said outside air monitoring means whenever the temperature of the outside air is below a predetermined minimum value for inhibiting the passage of said cooling control signal to said cooling actuator controller means.

2. An environmental control system as set forth in claim 1 wherein said control circuit further includes input means having a first plurality of diode means, each individually connected in a forward direction between an output of a different one of said zone controller means and the first input of one of said heat controller means and said cooling controller means and a second plurality of diode means, each individually connected in a reverse direction between an output of a different one of said zone controller means and the first input of the other one of said heat controller means and said cooling controller means.

3. An environmental control system as set forth in claim 1 wherein said first signal comparator means comprises differential amplifier means having a first input connected to receive command signals provided by said zone controller means and a second input connected to a source of reference potential over variable potentiometer means, said differential amplifier means being operable to provide a heat control signal proportional to the difference between said reference signal and said command signal for effecting energization of said heating apparatus, said potentiometer means being adjustable to preselect an amplitude of the command signal, and correspondingly the low temperature for a zone, at which a heating control signal capable of energizing the heating apparatus is provided.

4. An environmental control system as set forth in claim 3 wherein said first signal comparator means includes further potentiometer means for adjusting the gain of said differential amplifier means to permit preselection of the amount of change in the amplitude of a command signal required to effect energization of the heating apparatus.

5. An environmental control system as set forth in claim 1 wherein said second signal comparator means comprises first differential amplifier means having a first input connected to receive command signals provided by said zone controller means and a second input connected to a source of reference potential over a variable potentiometer means, said differential amplifier means being operable to provide a cooling control signal proportional to the difference between said command signal and said reference signal, said potentiometer means being adjustable to preselect the amplitude of the command signal, and correspondingly the high temperature for a zone, at which a cooling control signal capable of energizing the cooling apparatus is provided.

6. An environmental control system as set forth in claim 5 wherein said second signal comparator means includes further potentiometer means for adjusting the gain of said differential amplifier means to preselect the amount of change in amplitude of a command signal required to provide a cooling control signal of sufficient amplitude to effect energization of the cooling apparatus.

7. An environmental control system as set forth in claim 5 wherein said outside air monitoring means comprises a bridge circuit having a first leg including an outside air temperature sensing means for providing said an output signal indicative of the temperature of the outside air, a second leg for providing a third reference signal indicative of said predetermined maximum value for the temperature of the outside air, and a third leg for providing a fourth reference signal indicative of said predetermined minimum for the temperature of the outside air.

8. An environmental control system as set forth in claim 7 wherein said second control means comprises inhibit means interposed between the output of said second differential amplifier means and said cooling actuator controller means and fourth differential amplifier means having a first input connected to said first leg of said bridge circuit to receive said output signal and a second input connected to said third leg of said bridge circuit to receive said fourth reference signal, said fourth differential amplifier means being operable to normally enable said inhibit means whenever the difference between said output signal and said fourth reference signal exceeds a predetermined amount to permit said cooling signal to be extended to said cooling actuator controller means.

9. An environmental control system as set forth in claim 8 wherein said first control means comprises gating means interposed between the output of said second differential amplifier means and said outside air damper means, third differential amplifier means having a first input connected to said first leg of said bridge circuit to receive said output signal and a second input connected to said second leg of said bridge circuit to receive said third reference signal, said third differential amplifier means being operable to enable said gating means whenever the difference between said third reference signal and said output signal exceeds a predetermined amount to permit said cooling control signal to be extended to said outside air damper means.

10. An environmental control system as set forth in claim 5 wherein said cooling apparatus includes a plurality of cooling stages each having an associated cooling actuator controller means, said cooling actuator controller means being responsive to a cooling signal in excess of a threshold setting for the actuator cooling controller means to effect energization of an associated cooling stage, different cooling actuator controller means having different threshold settings to enable energization of said cooling stages in a predetermined sequence as the amplitude of said cooling control signal increases, said cooling stages being deenergized in the reverse sequence as the amplitude of the cooling signal decreases.

11. An environmental control system as set forth in claim 3 wherein said heating apparatus includes a plurality of heating stages each having an associated heating actuator controller means, said heating actuator controller means being responsive to a heating control signal in excess of a threshold setting for the heating actuator controller means to effect energization of an associated heating stage, different heating actuator controller means having different threshold settings to enable energization of said heating stages in a predetermined sequence as the amplitude of said heating control signal increases, said heating stages being deenergized in the reverse sequence as the amplitude of the heating signal decreases.

12. In a multizone environmental control system including an air conditioning unit for supplying at least cool air to a plurality of zones of a building, and outside air damper means controllable to permit outside air to be introduced into said system, a plurality of zone controller means including an individual zone controller means for each of said zones, each of said zone controller means being operable to provide a command signal of an amplitude indicative of the air temperature of the corresponding zone, control means including cooling actuator means for effecting selective energization of cooling apparatus of said air conditioning unit in accordance with command signals provided by said zone controller means, and cooling source control means responsive to the command signals provided by the zone controller means to provide a cooling control signal indicative of the amplitude of the command signal provided by the warmest zone for controlling said cooling actuator means, said cooling actuator means being enabled by a cooling control signal of a first predetermined amplitude to normally effect energization of the cooling apparatus to enable cool air to be supplied to the zones requiring cooling, said cooling actuator means being disabled to deenergize the cooling apparatus when the cooling control signal reaches a second predetermined amplitude, said cooling source control means including first control means normally enabled whenever the temperature of the outside air is less than a first value to control said outside air damper means to permit a preselected amount of outside air to be introduced into a cooling section of said air conditioning unit prior to energization of said cooling apparatus, and a second control means enabled whenever the temperature of the outside air is below a second value to inhibit the passage of said cooling control signal to said cooling actuator means.

13. An environmental control system as set forth in claim 12 wherein said cooling source control means includes outside air temperature sensing means operable to provide an output signal proportional to the temperature of the outside air, said first control means including gating means and signal comparator means for comparing said output signal with a reference signal and operable to enable said gating means whenever the temperature of the outside air is less than said first value to permit said cooling control signal to be extended to said outside air damper means.

14. An environmental control system as set forth in claim 13 wherein said control means includes inhibit means having further signal comparator means for comparing said output signal with a further reference signal and operable to enable said inhibit means whenever the temperature of the outside air is below said second value to prevent said cooling control signal from being extended to said cooling actuator means 15. An environmental control system as set forth in claim 12 which includes input means having means for individually connecting outputs of said zone controller means to an input of said cooling source control means over a set of unidirectional circuit paths to enable command signals greater than a predetermined value to be extended to said cooling source control means.

16. In a multizone environmental control system including an air conditioning unit having heating and cooling apparatus for supplying warm and cool air to a plurality of zones of a building, a plurality of zone controller means including an individual zone controller means for each of said zones, each of said zone controller means being operable to provide a command signal which varies in amplitude in accordance with changes in the temperature in the corresponding zone, a control circuit including heat source control means and cooling source control means, input means for extending the command signal provided by the zone controller means of the coolest zone to said heat source control means and the command signal provided by the zone controller means of the warmest zone to said cooling source control means, said heat source control means including first signal comparator means for comparing the command signal extended thereto with a first reference signal and for providing a heat control signal related in amplitude to the difference in amplitude between said command signal and said first reference signal, and heat actuator means enabled whenever the heat control signal exceeds a predetermined amplitude for effecting energization of the heating apparatus to enable warm air to be supplied to zones requiring heating, said first signal comparator means including means for permitting the preselection of the amount of change in the amplitude of a command signal relative to said first reference signal required to enable said heat actuator means, said cooling source control means including second signal comparator means for comparing the command signal extended thereto with a second reference signal of a predetermined amplitude and for providing a cooling control signal related in amplitude to the difference between said command signal and said second reference signal, and cooling actuator means enabled whenever the cooling control signal exceeds a predetermined amplitude for effecting energization of the cooling apparatus to enable cool air to be supplied to zones requiring cooling, said second signal comparator means including means for permitting preselection of the amount of change in the amplitude of said second command signal relative to said second reference signal required to enable said cooling actuator means.

17. An environmental control system as set forth in claim 16 wherein said first signal comparator means includes means for preselecting the amplitude of said first reference signal to thereby establish a zone temperature at which the heat actuator means is enabled to energize the heating apparatus.

18. An environmental control system as set forth in claim 16 wherein said second signal comparator means includes means for preselecting the amplitude of said second reference signal to thereby establish a zone temperature at which the cooling actuator means is enabled to energize the cooling apparatus.

* * * * *